(12) United States Patent
Kurapati et al.

(10) Patent No.: US 8,843,965 B1
(45) Date of Patent: Sep. 23, 2014

(54) METHOD AND APPARATUS FOR GENERATING RECOMMENDATION SCORES USING IMPLICIT AND EXPLICIT VIEWING PREFERENCES

(76) Inventors: Kaushal Kurapati, Yorktown Heights, NY (US); J. David Schaffer, Wappingers Falls, NY (US); Srinivas Gutta, Buchanan, NY (US)

(*) Notice: Subject to any disclaimer, the term of this patent is extended or adjusted under 35 U.S.C. 154(b) by 0 days.

(21) Appl. No.: 09/666,401

(22) Filed: Sep. 20, 2000

(51) Int. Cl.
| | |
|---|---|
| G06F 3/00 | (2006.01) |
| G06F 13/00 | (2006.01) |
| H04N 5/445 | (2011.01) |
| H04N 21/466 | (2011.01) |
| H04N 21/25 | (2011.01) |
| H04N 21/45 | (2011.01) |
| H04N 21/475 | (2011.01) |
| H04N 21/482 | (2011.01) |

(52) U.S. Cl.
CPC ............. *H04N 21/466* (2013.01); *H04N 21/25* (2013.01); *H04N 21/251* (2013.01); *H04N 21/45* (2013.01); *H04N 21/4532* (2013.01); *H04N 21/4668* (2013.01); *H04N 21/4756* (2013.01); *H04N 21/4826* (2013.01)
USPC .............................................. 725/46; 725/37

(58) Field of Classification Search
CPC ..... H04N 21/25; H04N 21/251; H04N 21/45; H04N 21/4532; H04N 21/466; H04N 21/4668; H04N 21/4756; H04N 21/4826
USPC ................................................ 725/34, 35, 46
See application file for complete search history.

(56) References Cited

U.S. PATENT DOCUMENTS

| | | | | |
|---|---|---|---|---|
| 5,446,891 A | * | 8/1995 | Kaplan et al. ........................... 1/1 |
| 5,495,846 A | * | 3/1996 | Uehara et al. ................. 600/443 |
| 5,749,081 A | * | 5/1998 | Whiteis ......................... 707/102 |
| 5,754,939 A | * | 5/1998 | Herz et al. .................... 455/3.04 |
| 5,758,257 A | | 5/1998 | Herz et al. ......................... 455/2 |
| 5,798,785 A | | 8/1998 | Hendricks et al. ................. 348/1 |
| 5,978,766 A | * | 11/1999 | Luciw ............... 705/1 |
| 6,133,909 A | * | 10/2000 | Schein et al. .................. 345/721 |
| 6,317,881 B1 | * | 11/2001 | Shah-Nazaroff et al. ....... 725/24 |
| 6,408,437 B1 | | 6/2002 | Hendricks et al. |
| 6,438,579 B1 | * | 8/2002 | Hosken ......................... 709/203 |
| 6,662,177 B1 | * | 12/2003 | Martino et al. .................... 707/3 |
| 6,704,931 B1 | * | 3/2004 | Schaffer et al. ................. 725/46 |

(Continued)

FOREIGN PATENT DOCUMENTS

| | | | |
|---|---|---|---|
| EP | 0854645 A2 | 7/1998 | ............ H04N 5/445 |
| GB | 2340638 A | 2/2000 | ............ H04N 7/088 |
| WO | WO9748230 | 12/1997 | .............. H04N 7/00 |
| WO | WO0115449 | 1/2001 | ............ H04N 7/173 |

OTHER PUBLICATIONS

Tuma, Jan J. et al., "Engineering Mathematics Handbook—Weighted Average", McGraw-Hill, 4th edition, p. 306.*

(Continued)

*Primary Examiner* — Jeremy Duffield

(57) ABSTRACT

A television programming recommender combines the explicit viewing preferences, i.e. user specified preferences, of viewers with their television viewing behavior (implicit preferences) to generate program recommendations. The explicit viewing preferences are utilized to generate an explicit recommendation score, E, for an upcoming television program. The implicit viewing preferences are utilized to generate an implicit recommendation score, I, for the program. A combined recommendation score, C, is computed based on the explicit and implicit scores, E and I. The combined recommendation score, C, can be computed using a weighted linear mapping.

33 Claims, 4 Drawing Sheets

IMPLICIT VIEWER PROFILE 500

| | ATTRIBUTE 540 | POSITIVE COUNTS 545 | NEGATIVE COUNTS 550 |
|---|---|---|---|
| 505 | CHANNEL 2 | 10 | 0 |
| 506 | CHANNEL 4 | 3 | 1 |
| 507 | CHANNEL 7 | 4 | 4 |
| | ... | | |
| 509 | SPORTS CHANNEL | 10 | 0 |
| ... | MUSIC CHANNEL | 1 | 0 |
| | ... | | |
| 510 | MORNING PROGRAMS | 2 | 2 |
| 511 | EARLY AFTERNOON PROGRAMS | 1 | 2 |
| 512 | LATE AFTERNOON PROGRAMS | 10 | 0 |
| 513 | EVENING PROGRAMS | 6 | 4 |
| | ... | | |

(56) References Cited

U.S. PATENT DOCUMENTS

| | | | | |
|---|---|---|---|---|
| 6,727,914 | B1* | 4/2004 | Gutta | 345/719 |
| 6,871,186 | B1* | 3/2005 | Tuzhilin et al. | 705/26 |
| 7,020,344 | B2* | 3/2006 | Edgar | 382/264 |
| 2002/0199194 | A1* | 12/2002 | Ali | 725/46 |

OTHER PUBLICATIONS

Gutta et al, "Mixture of Experts for Classification of Gender . . . " IEEE Transactions on Neural Networks, vol. I, #4, Jul. 2000.

Gutta et al., "Face Recognition Using Hybrid Classifiers," Pattern Recognition, vol. 30, #4, pp. 539-553 1997.

Gutta, "Face and Hand Gesture Recognition Using Hybrid Learning" Dissertation, GMU 1998; AAT 9904104; ISBN: 0599014938.

Dietterich, T. G. (2000). Ensemble Methods in Machine Learning. In J. Kittler and F. Roli (Ed.) *First International Workshop on Multiple Classifier Systems, Lecture Notes in Computer Science* (pp. 1-15) New York: Springer Verlag.

Rätsch, G. (1998). Ensemble learning methods for classification. Master's thesis, Dep. of Computer Science, University of Potsdam, Germany.

W.P. Lincoln et al, "Synergy of Clustering Multiple Back Propagation Networks", Advances in Neural Information Processing Systems (NIPS), vol. 1, pp. 650-657 (1990).

J. Kittler et al., "Combining Classifiers," Proc. 13th Int'l Conf. on Pattern Recognition (ICPR) IEEE Soc. Press, Vienna, Austria, vol. 2 Track B, pp. 897-901 (1996).

M.P. Perrone et al., "When Networks Disagree: Ensemble Methods for Hybrid Neural Networks," Mammone Press pp. 126-142, (1993).

Y.S. Huang et al., "Combination of Multiple Classifiers with Measurement Values," Proc. 2nd Int'l Conf. on Document Analysis and Recognition, pp. 598-601 (1993).

T.K. Ho et al. "Decision Combination in Multiple Classifier Systems," IEEE Trans. Pattern Analysis and Machine Intelligence, vol. 16, #1, pp. 66-75, (1994).

L. Xu et al. "Methods for Combining Multiple Classifers and their Applications to Handwriting . . . ," IEEE Trans. Sys. Man and Cybernetics, vol. 22, #3, pp. 418-435 (1992).

G. Rogova, "Combining the Results of Several Neural Network Classifiers," Neural Networks, vol. 7, #5, pp. 777-781 (1994).

H.S. Seung et al., "Query by Committee," Proc. 5th Annual ACM Workshop on Computational Learning Theory, vol. 5, pp. 287-294(1992).

http://citeseer.ist.psu.edu/perrone93when.html, (2006).

* cited by examiner

EXPLICIT VIEWER PROFILE 400

| | ATTRIBUTE 440 | NUMERICAL (OR SYMBOLIC) REPRESENTATION 450 |
|---|---|---|
| 405 | CHANNEL 2 | 3 |
| 406 | CHANNEL 4 | 4 |
| 407 | CHANNEL 7 | 3 |
| 408 | ... | |
| 409 | SPORTS CHANNEL | 7 |
| ... | MUSIC CHANNEL | 2 |
| | ... | |
| 410 | MORNING PROGRAMS | 1 |
| 411 | EARLY AFTERNOON PROGRAMS | 3 |
| 412 | LATE AFTERNOON PROGRAMS | 7 |
| 413 | EVENING PROGRAMS | 5 |
| | ... | |

FIG. 4

IMPLICIT VIEWER PROFILE 500

|     | ATTRIBUTE 540 | POSITIVE COUNTS 545 | NEGATIVE COUNTS 550 |
| --- | --- | --- | --- |
| 505 | CHANNEL 2 | 10 | 0 |
| 506 | CHANNEL 4 | 3 | 1 |
| 507 | CHANNEL 7 | 4 | 4 |
|     | ... |   |   |
| 509 | SPORTS CHANNEL | 10 | 0 |
| ... | MUSIC CHANNEL | 1 | 0 |
|     | ... |   |   |
| 510 | MORNING PROGRAMS | 2 | 2 |
| 511 | EARLY AFTERNOON PROGRAMS | 1 | 2 |
| 512 | LATE AFTERNOON PROGRAMS | 10 | 0 |
| 513 | EVENING PROGRAMS | 6 | 4 |
|     | ... |   |   |

FIG. 5

METHOD AND APPARATUS FOR GENERATING RECOMMENDATION SCORES USING IMPLICIT AND EXPLICIT VIEWING PREFERENCES

FIELD OF THE INVENTION

The present invention relates to methods and apparatus for recommending television programming, and more particularly, to techniques for generating recommendation scores using implicit and explicit viewer preferences.

BACKGROUND OF THE INVENTION

As the number of channels available to television viewers has increased, along with the diversity of the programming content available on such channels, it has become increasingly challenging for television viewers to identify television programs of interest. Historically, television viewers identified television programs of interest by analyzing printed television program guides. Typically, such printed television program guides contained grids listing the available television programs by time and date, channel and title. As the number of television programs has increased, it has become increasingly difficult to effectively identify desirable television programs using such printed guides.

More recently, television program guides have become available in an electronic format, often referred to as electronic program guides (EPGs). Like printed television program guides, EPGs contain grids listing the available television programs by time and date, channel and title. Some EPGs, however, allow television viewers to sort or search the available television programs in accordance with personalized preferences. In addition, EPGs allow for on-screen presentation of the available television programs.

While EPGs allow viewers to identify desirable programs more efficiently than conventional printed guides, they suffer from a number of limitations, which if overcome, could further enhance the ability of viewers to identify desirable programs. For example, many viewers have a particular preference towards, or bias against, certain categories of programming, such as action-based programs or sports programming. Thus, the viewer preferences can be applied to the EPG to obtain a set of recommended programs that may be of interest to a particular viewer.

Thus, a number of tools have been proposed or suggested for recommending television programming. The Tivo™ system, for example, commercially available from Tivo, Inc., of Sunnyvale, Calif., allows viewers to rate shows using a "Thumbs Up and Thumbs Down" feature and thereby indicate programs that the viewer likes and dislikes, respectively. Thereafter, the TiVo receiver matches the recorded viewer preferences with received program data, such as an EPG, to make recommendations tailored to each viewer.

Implicit television program recommenders generate television program recommendations based on information derived from the viewing history of the viewer, in a non-obtrusive manner. FIG. 1 illustrates the generation of a viewer profile 140 using a conventional implicit television program recommender 160. The implicit viewer profile 140 is derived from a viewing history 125, indicating whether a given viewer liked or disliked each program. As shown in FIG. 1, the implicit television program recommender 160 processes the viewing history 125, in a known manner, to derive an implicit viewer profile 140 containing a set of inferred rules that characterize the preferences of the viewer. Thus, an implicit television program recommender 160 attempts to derive the viewing habits of the viewer based on the set of programs that the viewer liked or disliked.

Explicit television program recommenders, on the other hand, explicitly question viewers about their preferences for program attributes, such as title, genre, actors, channel and date/time, to derive viewer profiles and generate recommendations. FIG. 2 illustrates the generation of a viewer profile 240 using a conventional explicit television program recommender 260. The explicit viewer profile 140 is generated from a viewer survey 225 that provides a rating for each program attribute, for example, on a numerical scale that is mapped to various levels of interest between "hates" and "loves," indicating whether a given viewer liked or disliked each program. As shown in FIG. 2, the explicit television program recommender 260 processes the viewer survey 125, in a known manner, to generate an explicit viewer profile 240 containing a set of rules that implement the preferences of the viewer.

While such television program recommenders identify programs that are likely of interest to a given viewer, they suffer from a number of limitations, which if overcome, could further improve the quality of the generated program recommendations. For example, explicit television program recommenders typically do not adapt to the evolving preferences of a viewer. Rather, the generated program recommendations are based on the static survey responses. In addition, to be comprehensive, explicit television program recommenders require each user to respond to a very detailed survey. For example, assuming there are 180 different possible values for the "genre" attribute, and the user merely specifies his or her "favorite five genres," then no information is obtained about the user's preferences for the other 175 possible genres. Similarly, implicit television program recommenders often make improper assumptions about the viewing habits of a viewer that could have easily been identified explicitly by the viewer.

A need therefore exists for a method and apparatus for generating program recommendations based on implicit and explicit viewing preferences. A further need exists for a method and apparatus for generating program recommendations that is program attribute or feature specific.

SUMMARY OF THE INVENTION

Generally, a television programming recommender is disclosed that generates television program recommendations based on a combined implicit/explicit program recommendation score. Thus, the disclosed television programming recommender combines the explicit viewing preferences of viewers with their television viewing behavior (implicit preferences) to generate program recommendations.

Explicit viewing preferences are obtained, for example, by having viewers rate their preferences for various program attributes, including, for example, days and viewing times, channels, actors, and categories (genres) of television programs. The explicit viewing preferences are then utilized to generate an explicit recommendation score, E, for an upcoming television program.

Likewise, implicit viewing preferences are obtained, for example, by monitoring a user's viewing history and analyzing the programs that are actually watched by a user (positive examples) and the shows that are not watched by the user (negative examples). The implicit viewing preferences are then utilized to generate an implicit recommendation score, I, for an upcoming television program.

The present invention computes a combined recommendation score, C, based on the explicit and implicit scores, E and I. In one implementation, the combined recommendation score, C, can be computed using a weighted linear mapping. The combined recommendation score, C, can optionally be biased towards the explicit recommendation score, E, since the explicit recommendation score, E, represents the interests that the viewer has explicitly specified.

A more complete understanding of the present invention, as well as further features and advantages of the present invention, will be obtained by reference to the following detailed description and drawings.

BRIEF DESCRIPTION OF THE DRAWINGS

FIG. 4 is a table illustrating an exemplary explicit viewer profile;

FIG. 5 is a table illustrating an exemplary implicit viewer profile; and

DETAILED DESCRIPTION

Figure 1:
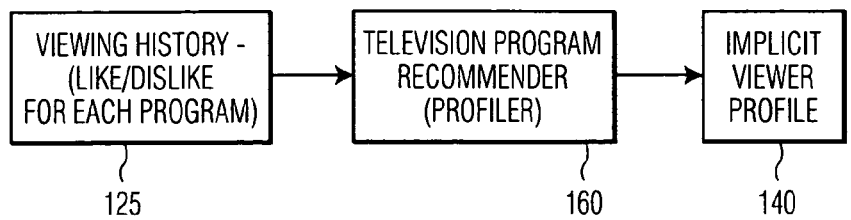
FIG. 1 illustrates the generation of an implicit profile using a conventional implicit television program recommender.
Figure 2:
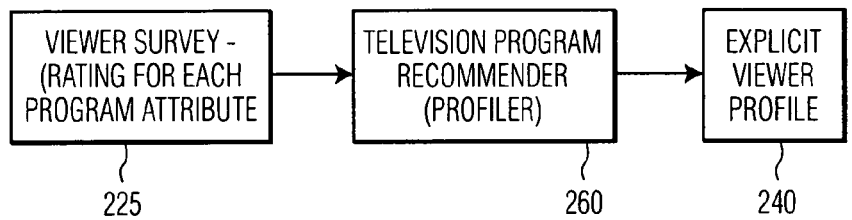
FIG. 2 illustrates the generation of an explicit profile using a conventional explicit television program recommender.
Figure 3:
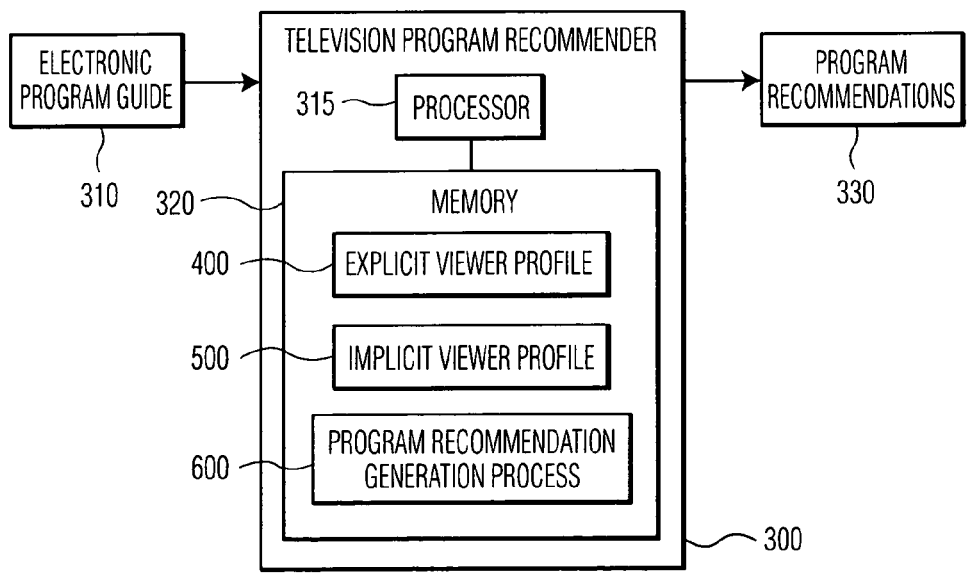
FIG. 3 is a schematic block diagram of a television program recommender in accordance with the present invention.

FIG. 3 illustrates a television programming recommender 300 in accordance with the present invention. As shown in FIG. 3, the television programming recommender 300 evaluates each of the programs in an electronic programming guide (EPG) 310 to identify programs of interest to a particular viewer. The set of recommended programs can be presented to the viewer, for example, using a set-top terminal/television (not shown) using well-known on-screen presentation techniques.

According to one feature of the present invention, the television programming recommender 300 generates television program recommendations based on a combined implicit/explicit program recommendation score. Thus, the present invention combines the explicit viewing preferences of viewers with their television viewing behavior (implicit preferences) to generate program recommendations. Generally, each viewer initially rates their preferences for various program attributes, including, for example, days and viewing times, channels, actors, and categories (genres) of television programs.

As shown in FIG. 3, an explicit profile 400, discussed further below in conjunction with FIG. 4 and generated in a well-known and conventional manner, is utilized for each viewer. An explicit recommendation score, E, discussed below, is then generated for an upcoming television program indicated in the EPG 310. Likewise, an implicit profile 500, discussed further below in conjunction with FIG. 5 and generated in a well-known and conventional manner, is utilized for each viewer. An implicit recommendation score, I, discussed below, is also generated for an upcoming television program indicated in the EPG 310.

The present invention computes a combined recommendation score, C, based on E and I. In one implementation, the combined recommendation score, C, is biased towards the explicit recommendation score, E, since the explicit recommendation score, E, represents the interests that the viewer has explicitly specified.

Thus, as shown in FIG. 3, the television programming recommender 300 includes the explicit viewer profile 400, the implicit viewer profile 500, each discussed further below in conjunction with FIGS. 4 and 5, respectively, and a program recommendation generation process 600, discussed further below in conjunction with FIG. 6. Generally, the program recommendation generation process 600 processes the explicit and implicit viewer profiles 400, 500 and computes the combined recommendation score, C, on which program recommendations 330 are based, in accordance with the present invention. It is noted that the numeric scales utilized in the explicit and implicit viewer profiles 400, 500 may not be the same, and the program recommendation generation process 600 may be required to convert one or both scales to a common representation.

The television program recommender 300 may be embodied as any computing device, such as a personal computer or workstation, that contains a processor 315, such as a central processing unit (CPU), and memory 320, such as RAM and ROM. In addition, the television programming recommender 300 may be embodied as any available television program recommender, such as the Tivo™ system, commercially available from Tivo, Inc., of Sunnyvale, Calif., or the television program recommenders described in U.S. patent application Ser. No. 09/466,406, filed Dec. 17, 1999, entitled "Method and Apparatus for Recommending Television Programming Using Decision Trees," and U.S. patent application Ser. No. 09/498,271, filed Feb. 4, 2000, entitled "Bayesian TV Show Recommender," or any combination thereof, as modified herein to carry out the features and functions of the present invention.

FIG. 4 is a table illustrating an exemplary explicit viewer profile 400. As shown in FIG. 4, the explicit viewer profile 400 contains a plurality of records 405-413 each associated with a different program attribute. In addition, for each attribute set forth in column 440, the viewer profile 400 provides a numerical representation in column 450, indicating the relative level of interest of the viewer in the corresponding attribute. As discussed below, in the illustrative explicit viewer profile 400 set forth in FIG. 4, a numerical scale between 1 ("hate") and 7 ("love") is utilized. For example, the explicit viewer profile 400 set forth in FIG. 4 has numerical representations indicating that the user particularly enjoys programming on the Sports channel, as well as late afternoon programming.

In an exemplary embodiment, the numerical representation in the explicit viewer profile 400 includes an intensity scale such as:

| Number | Description |
|---|---|
| 1 | Hates |
| 2 | Dislikes |
| 3 | Moderately negative |
| 4 | Neutral |
| 5 | Moderately positive |
| 6 | Likes |
| 7 | Loves |

The explicit recommendation score, E, is generated based on the attribute values set forth in the explicit viewer profile 400. The explicit recommendation score, E, can be normalized, for example, to 1.0. The value of each weight factor could be determined empirically or by training a set of weights on the ground truth given by the particular viewer.

FIG. 5 is a table illustrating an exemplary implicit viewer profile 500 corresponding to the same viewer as the explicit viewer profile 400, discussed above. As shown in FIG. 5, the implicit viewer profile 500 contains a plurality of records 505-513 each associated with a different program attribute. In addition, for each attribute set forth in column 540, the implicit viewer profile 500 provides the corresponding positive and negative counts, in a known manner, in columns 545 and 550, respectively, indicating the number of times the viewer watched and did not watch, respectively, programs having each attribute. For each positive and negative program example (i.e., programs watched and not watched), a number of program attributes are classified in the user profile 500. For example, if a given viewer watched a given sports program ten times on Channel 2 in the late afternoon, then the positive counts associated with this features in the implicit viewer profile 500 would be incremented by 10, and the negative counts would be 0 (zero). Since the implicit viewing profile 500 is based on the user's viewing history, the data contained in the profile 500 is revised over time, as the viewing history grows.

Figure 6:
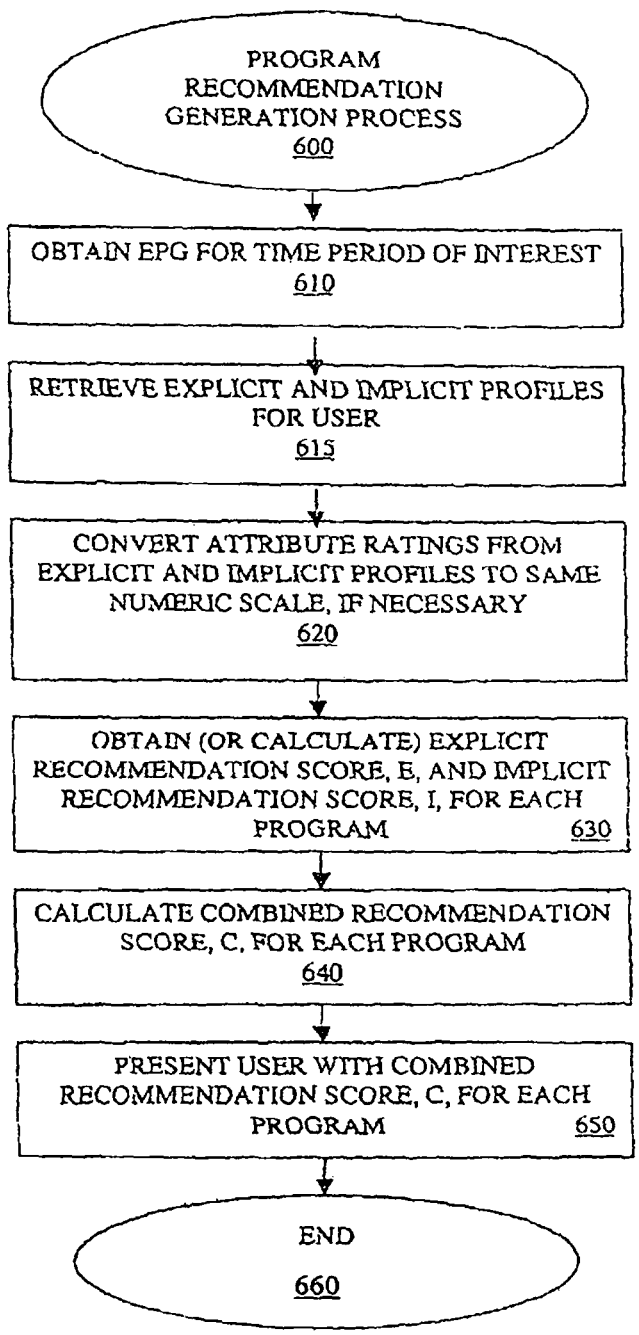
FIG. 6 is a flow chart describing the program recommendation generation process of FIG. 3 embodying principles of the present invention.

FIG. 6 is a flow chart describing the program recommendation generation process 600 embodying principles of the present invention. The program recommendation generation process 600 processes the explicit and implicit viewer profiles 400, 500 and computes the combined recommendation score, C, in accordance with the present invention.

As shown in FIG. 6, the program recommendation generation process 600 initially obtains the electronic program guide (EPG) 310 during step 610 for the time period of interest. Thereafter, the appropriate explicit and implicit viewer profiles 400, 500 are obtained for the viewer during step 615. The program recommendation generation process 600 then converts the numeric ratings for each attribute from the explicit or implicit viewer profiles 400, 500 to the same numeric scale, if necessary, during step 620.

The program recommendation generation process 600 obtains (or calculates) the explicit recommendation score, E, and the implicit recommendation score, I, for each program identified in the EPG 310 for the time period of interest during step 630. In one embodiment, the explicit recommendation score, E, is provided by a conventional explicit television programming recommender and the implicit recommendation score, I, is provided by a conventional implicit television programming recommender. In an alternate embodiment, the program recommendation generation process 600 can directly calculate the implicit recommendation score, I, in the manner described in U.S. patent application Ser. No. 09/466,406, filed Dec. 17, 1999, entitled "Method and Apparatus for Recommending Television Programming Using Decision Trees," or U.S. patent application Ser. No. 09/498,271, filed Feb. 4, 2000, entitled "Bayesian TV Show Recommender," each assigned to the assignee of the present invention and incorporated by reference herein.

The program recommendation generation process 600 then calculates the combined recommendation score, C, for each program during step 640. In an illustrative implementation, the program recommendation generation process 600 calculates the combined recommendation score, C, in two parts, with a score based purely on the explicit profile of the user being computed in a first part and then combining the explicit and implicit recommendation scores to give a total combined score, C for a program.

Each show is characterized by a show vector, S, that provides a value for each attribute, such as <day/time (dt) slot, channel (ch), genres [1 ... k], description>. In an explicit profile 500, viewers typically only rate the day/time slot, channel and genres. Thus, only those features are maintained in the show vector, S. Thus, the show vector, S, becomes <dt, ch, g1, g2, ... gK>.

A rating can be found for each of these features in S, in the user's explicit profile 500. Therefore, a rating vector is associated with each S, called R:

$$R = <r\_dt, r\_ch, r1, r2, \ldots rK>$$

The explicit recommender score, E, is computed as a function of R. Thus, $$E = f(R)$$

The ratings [1 ... 7] are mapped on a [−1 ... 1] scale. A polynomial can be defined that satisfies certain boundary conditions, such as R equals 1 maps to −1, R equals 4 maps to 0, and R equals 7 maps to +1.

Once the mapping polynomial is defined, E can be defined as a weighted average of the individual ratings of the program's features. Let W_dt, W_ch, W_g represent the weights for day/time slot, channel and genres, respectively. It is noted that in the illustrative embodiment, only one weight is defined for all the genres, implying individual genres will contribute equally and if there are K genres, each genre will weigh W_g/K.

$$E = W\_dt \times r\_dt + W\_ch \times r\_ch + (W\_g/K) \times \Sigma_{j=1}^{k} r\_j$$

It is noted, however, that each individual genre could have a different weight $W\_g\_j$. For example, it has been observed that the first genre in the list of genres assigned to a given program seems to be the primary classification for that program, and the successive genres in the list diminish in relevance to that program. To illustrate, assume a given program is classified as a "comedy" as its first genre, followed by "situation" and "family," in order, as additional genres. Thus, the genre "comedy" can be weighed more heavily than the genre "situation," which in turn weighs more heavily than the genre "family" in the final weighted score computation of E (explicit recommendation score), above.

Returning to the illustrative embodiment, where all genres are weighted equally, the numerical values are now determined for the weights, before the explicit program recommendation score, E, is computed. This can be done empirically, i.e., based on observation or it can be dictated by input from the features, which stand out from the user's profile.

After computing the explicit program recommendation score, E, the combined recommendation score, C, is computed for a program that is dependent on both scores, E (explicit) and I (implicit).

$$C = g(E, I).$$

In one embodiment, the function, g( ), could be a weighted linear mapping. Thus, $$C = \{W\_e * E + W\_i * I\} / \{W\_e + W\_i\}$$

Where "W_e" and "W_i" are weights that specify how much E and I contribute to the total score. W_e and W_i can be computed based on the following observations:

When, the implicit and explicit scores are roughly the same, W_e=W_i=0.5−equal weighting (or possibly a slight bias towards W_e)

When E>>I, the explicit interests of the user dictate that the show is of interest to that person, while the implicit profile indicates that it is not. Assuming the explicit information is more precise, the combined score, C, should depend more heavily on E than I. Hence, W_e>>W_i.

The case of E<<I is similar to the above case. The combined score, C, should reflect more of E than I. Hence, again W_e>>W_i.

The above observations indicate that as the difference between the explicit and implicit scores increase, the explicit score, E, should be weight more heavily.

Finally, the combined recommendation scores, C, for each program in the time period of interest can be presented to the user during step 650, for example, using on-screen programming techniques, before program control terminates during step 660.

It is to be understood that the embodiments and variations shown and described herein are merely illustrative of the principles of this invention and that various modifications may be implemented by those skilled in the art without departing from the scope and spirit of the invention.

What is claimed is:

1. A method for recommending television programs via a program recommending machine, comprising:
    obtaining, by the machine, a list of one or more programs;
    determining, by the machine, an explicit recommendation score, E, for the one or more programs based on an explicit profile associated with a user;
    determining, by the machine, an implicit recommendation score, I, for the one or more programs based on an implicit profile associated with the user;
    generating, by the machine, a combined recommendation score, C, based on the explicit recommendation score, E, and the implicit recommendation score, I; and
    providing, by the machine, a recommendation of one or more of the programs in the list based on the combined recommendation score, C,
    wherein said combined recommendation score, C, is substantially equally biased between said explicit recommendation score, E and the implicit recommendation score, I, when the explicit recommendation score, E, is substantially equal to the implicit recommendation score, I, and is biased increasingly towards said explicit recommendation score, E, in response to an increase in an absolute difference between the explicit recommendation score, E, and the implicit recommendation score, I.

2. The method of claim 1, wherein said list of one or more programs is obtained from an electronic program guide.

3. The method of claim 1, wherein said explicit recommendation score, E, is provided by an explicit program recommender.

4. The method of claim 1, wherein said explicit recommendation score, E, is defined as a weighted average of individual ratings of program features.

5. The method of claim 1, wherein said implicit recommendation score, I, is provided by an implicit program recommender.

6. The method of claim 1, wherein said combined recommendation score, C, is computed using a weighted linear mapping of said explicit recommendation score, E, and said implicit recommendation score, I.

7. The method of claim 1, including presenting said combined recommendation score, C, for each of said one or more programs to a user.

8. A method for generating a recommendation score for a television program via a program recommending machine, comprising:
    determining, at the machine, an explicit recommendation score, E, for the program based on an explicit profile associated with a user;
    determining, at the machine, an implicit recommendation score, I, for the program based on an implicit profile associated with the user;
    generating, at the machine, a combined recommendation score, C, for the program based on the explicit recommendation score, E, and the implicit recommendation score, I; and
    selectively providing, at the machine, a recommendation of the program based on the combined recommendation score, C,
    wherein said combined recommendation score, C, is substantially equally biased between said explicit recommendation score, E and the implicit recommendation score, I, when the explicit recommendation score, E, is substantially equal to the implicit recommendation score, I, and is biased increasingly towards said explicit recommendation score, E, in response to an increase in an absolute difference between the explicit recommendation score, E, and the implicit recommendation score, I.

9. The method of claim 8, wherein said program is identified in an electronic program guide.

10. The method of claim 8, wherein said explicit recommendation score, E, is provided by an explicit program recommender.

11. The method of claim 8, wherein said explicit recommendation score, E, is defined as a weighted average of individual ratings of program features.

12. The method of claim 8, wherein said implicit recommendation score, I, is provided by an implicit program recommender.

13. The method of claim 8, wherein said combined recommendation score, C, is computed using a weighted linear mapping of said explicit recommendation score, E, and said implicit recommendation score, I.

14. The method of claim 8, including presenting said combined recommendation score, C, for said program to a user.

15. A system for obtaining a recommendation for a television program for a user, the program having attributes, comprising:
    a memory for storing computer readable code; and
    a processor operatively coupled to the memory, the processor configured to:
        obtain a list of one or more programs;
        determine an explicit recommendation score, E, for the one or more programs based on an explicit profile of a user;
        determine an implicit recommendation score, I, for the one or more programs based on an implicit profile of the user;
        generate a combined recommendation score, C, based on the explicit recommendation score, E, and the implicit recommendation score, I; and
        provide a recommendation of one or more of the programs in the list based on the combined recommendation score,
    wherein said combined recommendation score, C, is substantially equally biased between said explicit recommendation score, E and the implicit recommendation score, I, when the explicit recommendation score, E, is substantially equal to the implicit recommendation score, I, and is biased increasingly towards said explicit recommendation score, E, in response to an increase in an absolute difference between the explicit recommendation score, E, and the implicit recommendation score, I.

16. The system of claim 15, wherein said list of one or more programs is obtained from an electronic program guide.

17. The system of claim 15, wherein said explicit recommendation score, E, is defined as a weighted average of individual ratings of program features.

18. The system of claim 15, wherein said combined recommendation score, C, is computed using a weighted linear mapping of said explicit recommendation score, E, and said implicit recommendation score, I.

19. The system of claim 15, wherein said processor is further configured to present said combined recommendation score, C, for each of said one or more programs to a user.

20. A non-transitory computer-readable medium, readable by a data processing device, encoded with a computer program having code for causing the data processing device to perform the following method steps:
   maintaining an explicit viewer profile with respect to a user;
   maintaining an implicit viewer profile, with respect to the user, wherein the implicit user profile is distinct from the explicit viewer profile;
   receiving information regarding at least one program;
   generating an explicit recommendation score for the program based on the explicit viewer profile and at least part of the information regarding the program;
   generating an implicit recommendation score for the program based on the implicit viewer profile and at least part of the information regarding the program;
   calculating a combined recommendation score from the explicit recommendation score and the implicit recommendation score; and
   providing a recommendation of the at least one program based on the combined recommendation score,
   wherein said combined recommendation score, C, is substantially equally biased between said explicit recommendation score, E and the implicit recommendation score, I, when the explicit recommendation score, E, is substantially equal to the implicit recommendation score, I, and is biased increasingly towards said explicit recommendation score, E, in response to an increase in an absolute difference between the explicit recommendation score, E, and the implicit recommendation score, I.

21. The non-transitory computer-readable medium of claim 20, wherein said calculating includes taking a weighted average of the explicit recommendation score and the implicit recommendation score.

22. The method of claim 1, wherein the explicit recommendation score represents a complete explicit recommendation by an explicit program recommender, based on a first set of ratings of program features derived from an explicit profile; the implicit recommendation score represents a complete implicit recommendation by an implicit program recommender, based on a second set of ratings of program features derived from an implicit profile; and the generating of the combined recommendation score uses the implicit and explicit recommendation scores without reference to either the first or second set of ratings of program features.

23. The method of claim 8, wherein the explicit recommendation score represents a complete explicit recommendation by an explicit program recommender, based on a first set of ratings of program features derived from an explicit profile; the implicit recommendation score represents a complete implicit recommendation by an implicit program recommender, based on a second set of ratings of program features derived from an implicit profile; and the generating of the combined recommendation score uses the implicit and explicit recommendation scores without reference to either the first or the second set of ratings of program features.

24. The system of claim 15, wherein the explicit recommendation score represents a complete explicit recommendation by an explicit program recommender, based on a first set of ratings of program features derived from an explicit profile; the implicit recommendation score represents a complete implicit recommendation by an implicit program recommender, based on a second set of ratings of program features derived from an implicit profile; and the generating of the combined recommendation score uses the implicit and explicit recommendation scores without reference to either the first or the second set of ratings of program features.

25. The non-transitory computer-readable medium of claim 20, wherein the explicit recommendation score represents a complete explicit recommendation by an explicit program recommender, based on a first set of ratings of program features derived from the explicit profile; the implicit recommendation score represents a complete implicit recommendation by an implicit program recommender, based on a second set of ratings of program features derived from the implicit profile; and the generating of the combined recommendation score uses the implicit and explicit recommendation scores without reference to either the first or second set of ratings of program features.

26. The method of claim 1, wherein the explicit recommendation score, E, is normalized and is defined as a weighted average of individual ratings of program features determined using a first group of weights, and further wherein the combined recommendation score, C, is calculated in accordance with the following equation:

$$C = \{W\_e * E + W\_i * I\} / \{W\_e + W\_i\}$$

where $W\_e$, and $W\_i$ are weighting coefficients of another group of weights and are operable to specify how much E and I contribute to the combined recommendation score, C, respectively, where $W\_e$ and $W\_i$ are substantially equal to each other when the explicit recommendation score E, is substantially equal to the implicit recommendation score I, and wherein $W\_e$ increases relative to $W\_i$ based upon an absolute difference between the explicit recommendation score E, and the implicit recommendation score I.

27. The method of claim 8, wherein the combined recommendation score is calculated in accordance with the following equation:

$$C = \{W\_e * E + W\_i * I\} / \{W\_e + W\_i\}$$

where $W\_e$, and $W\_i$ are weighting coefficients operable to specify how much E and I contribute to the combined recommendation score, C, respectively.

28. The system of claim 15, wherein the combined recommendation score is calculated in accordance with the following equation:

$$C = \{W\_e * E + W\_i * I\} / \{W\_e + W\_i\}$$

where $W\_e$, and $W\_i$ are weighting coefficients operable to specify how much E and I contribute to the combined recommendation score, C, respectively.

29. The medium of claim 20, wherein the combined recommendation score is calculated in accordance with the following equation:

$$C = \{W\_e * E + W\_i * I\} / \{W\_e + W\_i\}$$

where $W\_e$, and $W\_i$ are weighting coefficients operable to specify how much E and I contribute to the combined recommendation score, C, respectively.

30. The method as claimed in claim 26, wherein the weights $W\_e$ and $W\_i$ are varied in dependence on a difference between E and I, where $W\_e \approx W\_i$, when $E \approx I$, and $W\_e \gg W\_i$ when either $E > I$ or $E \ll I$.

31. The method as claimed in claim 27, wherein the weights $W\_e$ and $W\_i$ are varied in dependence on a difference between E and I, where $W\_e \approx W\_i$, when $E \approx I$, and $W\_e \gg W\_i$ when either $E \gg I$ or $E \ll I$.

32. The method as claimed in claim 28, wherein the weights $W\_e$ and $W\_i$ are varied in dependence on a difference between E and I, where $W\_e \approx W\_i$, when $E \approx I$ and $W\_e \gg W\_i$ when either $E \gg I$ or $E \ll I$.

33. The method as claimed in claim 29, wherein the weights $W\_e$ and $W\_i$ are varied in dependence on a difference between E and I, where $W\_e \approx W\_i$, when $E \approx I$, and $W\_e \gg W\_i$ when either $E \gg I$ or $E \ll I$.

\* \* \* \* \*